United States Patent [19]

Gu

[11] Patent Number: 5,697,088
[45] Date of Patent: Dec. 9, 1997

[54] BALUN TRANSFORMER

[75] Inventor: Wang-Chang Albert Gu, Coral Springs, Fla.

[73] Assignee: Motorola, Inc., Schaumburg, Ill.

[21] Appl. No.: 692,161

[22] Filed: Aug. 5, 1996

[51] Int. Cl.⁶ .............................. H04B 1/10; H01P 1/203
[52] U.S. Cl. .......................... 455/307; 333/26; 333/204; 455/292
[58] Field of Search ........................ 333/116, 26, 204; 455/307, 317, 326, 327, 292

[56] References Cited

U.S. PATENT DOCUMENTS 3,999,150  12/1976  Caragliano et al. ............ 333/116
5,061,910  10/1991  Bouny ............................... 333/26
5,164,690  11/1992  Yeh et al. ......................... 333/204
5,534,830   7/1996  Ralph ............................ 333/26 X

FOREIGN PATENT DOCUMENTS

59-148405  8/1984  Japan ................................ 333/26

Primary Examiner—Paul Gensler
Attorney, Agent, or Firm—Barbara R. Doutre

[57] ABSTRACT

First and second transmission line couplers (202, 204) one being configured in an asymmetrical open circuit configuration, the other being configured in an asymmetrical short circuit configuration, are coupled together to form a balun transformer (200). Balun transformer (200, 400, 500) can be implemented in three port bandpass filter (800) or other differential circuits to combine the functionality of a balun transformer and a two-pole filter into one circuit.

8 Claims, 8 Drawing Sheets

BALUN TRANSFORMER

TECHNICAL FIELD

This invention relates in general to differential circuits and more particularly to balun transformers.

BACKGROUND

Figure 1:
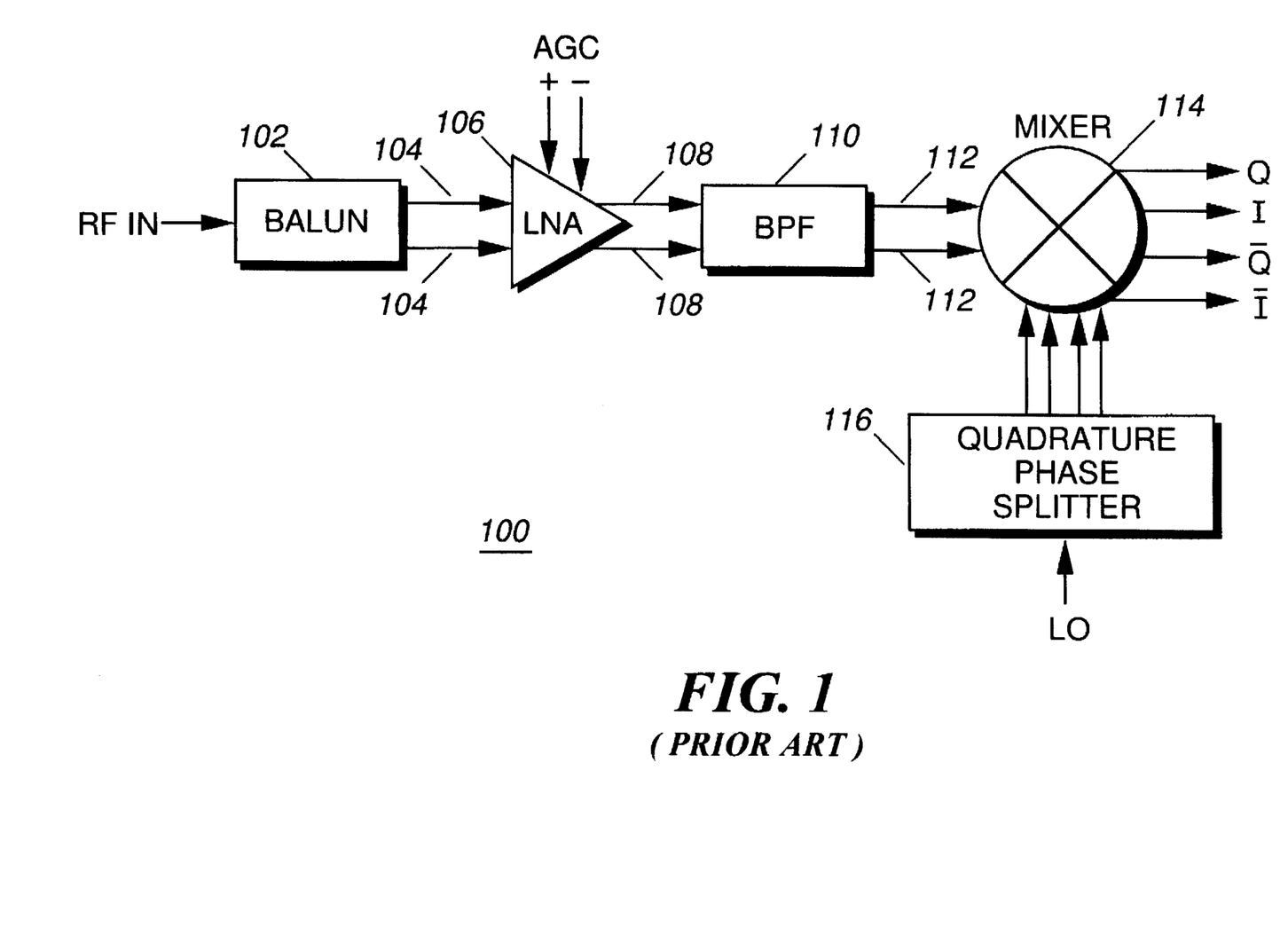
FIG. 1 is a prior art block diagram of a radio receiver.

It is well known that differential circuit techniques offer better circuit-to-circuit isolation and improved dynamic range. A typical radio frequency (RF) receiver front-end adopting a differential circuit topology is shown in FIG. 1 of the accompanying drawings. The radio receiver 100 includes a balun transformer 102 for receiving an RF signal. The balun transformer takes the unbalanced (single-ended) signal and transforms it to a balanced (differential) signal 104. Differential signal 104 refers to two signals of equal magnitude which are out of phase by 180 degrees. This differential signal 104 is fed to a low noise amplifier (LNA) 106 which is controlled through an automatic gain control (AGC). An amplified differential signal 108 is then filtered through a bandpass filter (BPF) 110. The filtered signal 112 is then mixed at mixer 114 with a local oscillator (LO) signal which has been split by a quadrature phase splitter 116. Mixer 114 then generates a quadrature output signal QI QI.

Circuit designers of portable and mobile radio products are continually searching for ways to simplify receiver designs and decrease parts count, size, and cost. It would be desirable to have a simplified RF receiver which could achieve these goals while maintaining the specifications of isolation, dynamic range, sensitivity, and frequency selection.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

A transmission line coupler is a four terminal, four pork network which can be completely characterized by its coupling factor, k, its impedance $Z_0$, and the electrical length $\theta$ at a specified frequency. Many possible two-port networks may be formed by either opening or shorting two of the terminals to provide a two-pole bandpass filter, also known as a quarter wave coupler.

Figure 2:
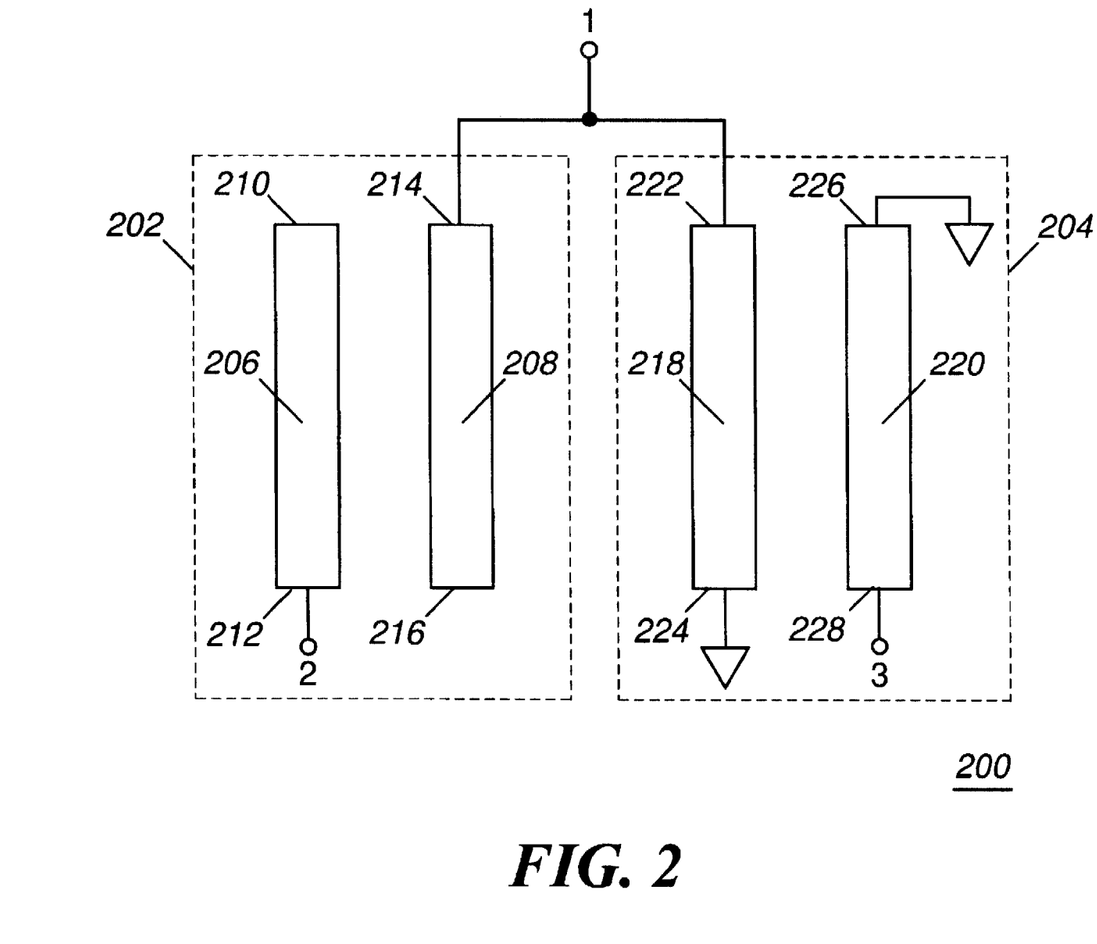
FIG. 2 is a transmission line balun transformer in accordance with the present invention.

In accordance with the present invention, two transmission line couplers, one in an open-ended configuration and one in a short circuited configuration, are coupled together to form an asymmetrical pair. When combined, they exhibit the unique property of a balun transformer. Referring now to FIG. 2, there is shown the balun transformer 200 in accordance with the present invention. The balun 200 includes first and second transmission line couplers 202, 204. Although not shown, the ground of the transmission line coupler is implicitly assumed. Each transmission line coupler 202, 204 is configured into a two-pole bandpass filter, one being configured in an open circuit configuration while the other is configured in a short circuit configuration. These transmission line couplers will also be referred to as quarter wave couplers, 202, 204. The two transmission line couplers 202, 204 are coupled together to form a three-port balun transformer having an input port 1 and first and second output ports 2, 3. The balun transformer 200 receives a radio frequency (RF) signal at the input port 1 and generates a differential output signal at the first and second output ports 2, 3.

The transmission line coupler 202 is formed of first and second adjacent transmission lines 206, 208 coupled through a coupling factor of 3 dB and an electrical length of 90 degrees at a specified frequency. The two coupled transmission lines provide first, second, third, and fourth terminals 210, 212, 214, 216. The first and fourth terminals 210, 216 are diagonally opposed and open circuited. The third terminal 214 functions as an input terminal, and the second terminal 212 functions as an output terminal.

The second transmission line coupler 204 is formed of third and fourth adjacent transmission lines 218, 220 coupled through a coupling factor of 3 dB and an electrical length of 90 degrees at a specified frequency. These coupled transmission lines 218, 220 provide first, second, third and fourth terminals, 222, 224, 226, and 228. The first terminal 222 functions an input terminal, the second and third terminals 224, 226 are diagonally opposed and shorted to ground potential, and the fourth terminal 228 functions as an output terminal. The input terminal 214 of the first transmission line coupler 202 and the input terminal 222 of the second transmission line coupler 204 are coupled together to form an input port 1 for receiving an RF signal. The output terminal 212 of the first transmission line coupler 202 and the output terminal 228 of the second transmission line coupler 204 provide first and second output ports 2, 3 for generating a differential output signal in response to the RF signal. The balun transformer of the present invention can be re-configured in a variety of formats but must maintain diagonally opposed short circuited terminals to ground potential in one transmission line coupler and diagonally opposed open circuited terminals in another transmission line coupler.

Figure 3:
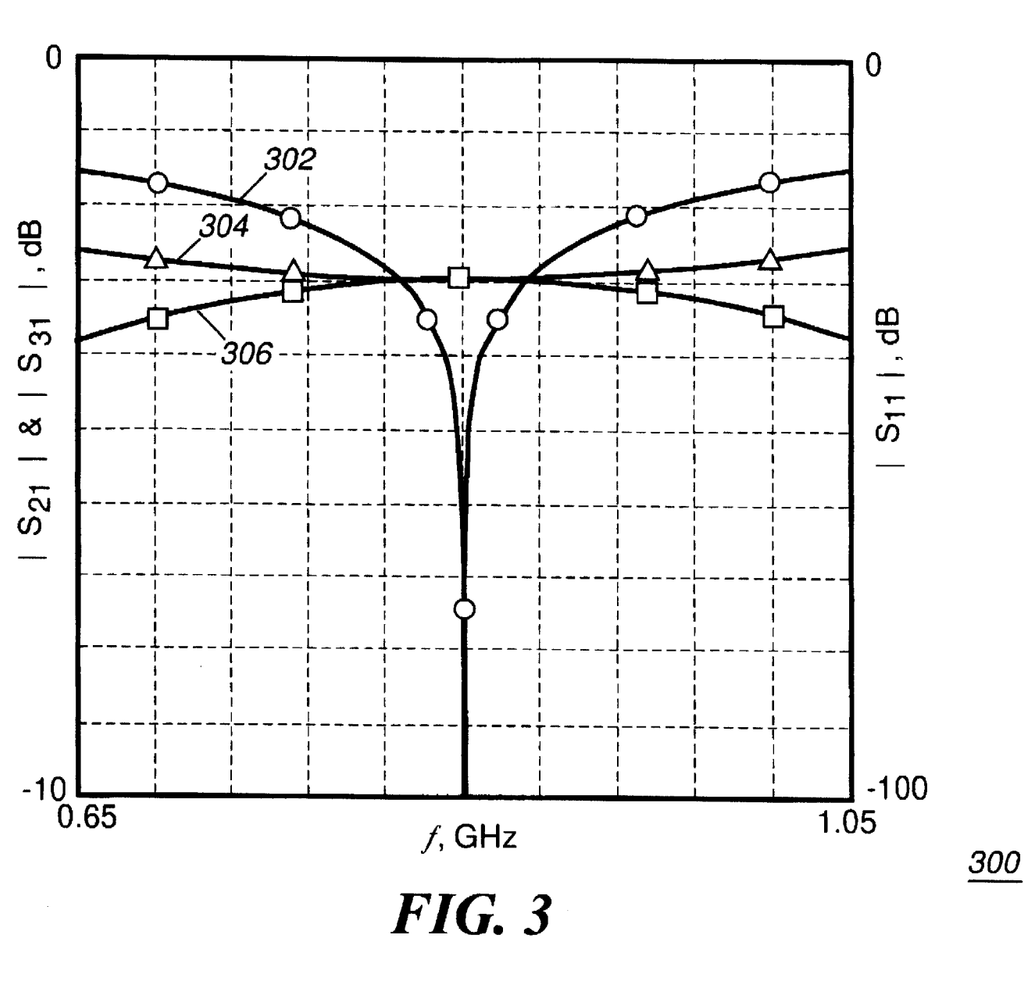
FIG. 3 is a graph of a simulated frequency response for the circuit of FIG. 2.

Referring now to FIG. 3, there is shown a graph 300 of a simulated frequency response for the balun transformer shown in FIG. 2. For this simulation, each quarter wave coupler was characterized by a coupling factor of 3 dB, an impedance $Z_0$ of approximately 70 ohms, and an electrical length of 90 degrees at a frequency, f, of 850 megahertz (MHz). The circuit simulation was performed over a frequency range of 0.65 gigahertz (GHz) to 1.05 GHz. The magnitude of the return loss, $S_{11}$, at the input port is shown by designator 302. The insertion loss between the input port and the first output port, $S_{21}$, is represented by designator 304, and the insertion loss between the first port and second output port, $S_{31}$, is represented by designator 306. The narrowband response results in excellent differential phase response. A bandwidth of approximately 30 percent was achieved for a very tight tolerance of 2 degree variation in differential phase angle.

Schematically, the balun transformer of the present invention comprises diagonally opposed open circuited terminals and diagonally opposed terminals short circuited to ground, however one skilled in the art appreciates that the physical implementation can take on many forms.

Figure 4:
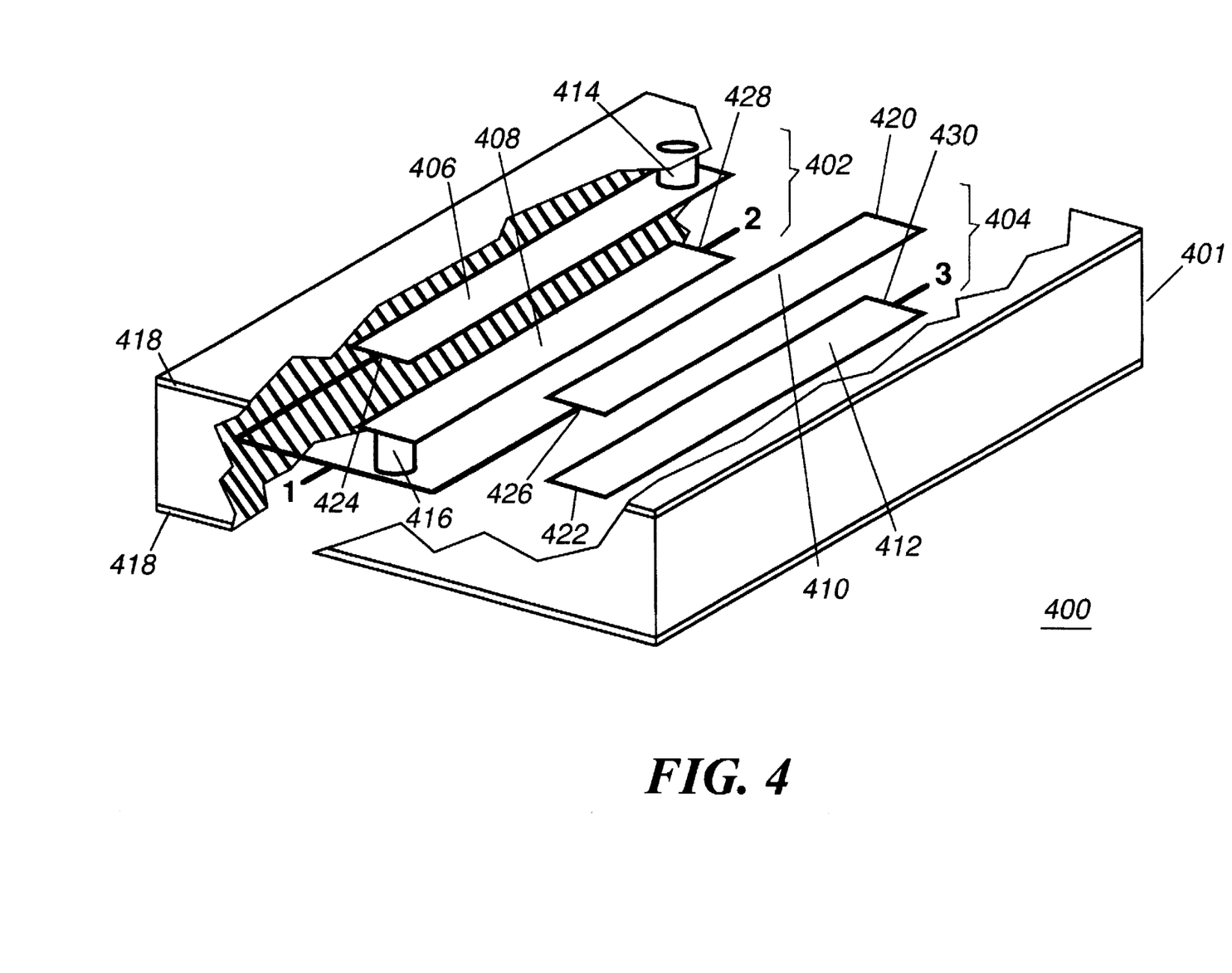
FIG. 4 is another embodiment of the balun transformer in accordance with the present invention.

Referring now to FIG. 4, there is shown another embodiment of the balun transformer of the present invention. In this isometric cut-away view, the balun transformer 400 is formed using first and second transmission line couplers 402, 404, where each coupler 402, 404 comprises adjacent, or co-located, transmission lines coupled on parallel planes of a substrate 401. Coupler 402 is formed of co-located transmission lines 406, 408 while coupler 404 is formed of co-located transmission lines 410, 412. In the first coupler 402, one pair of opposing terminals 414, 416 located on parallel planes are short circuited to ground 418, while in the second coupler 404, a pair of opposing terminals 420, 422 are open circuited. Terminals 424, 426 are coupled together to provide an input port 1 while terminals 428, 430 provide first and second output ports 2, 3.

Hence, while schematically shown as diagonally opposed, one skilled in the art appreciates that in the physical implementation, the asymmetrical grounding is achieved by shorting to ground (and open circuiting) opposing ends of parallel transmission lines on opposing planes.

Figure 5:
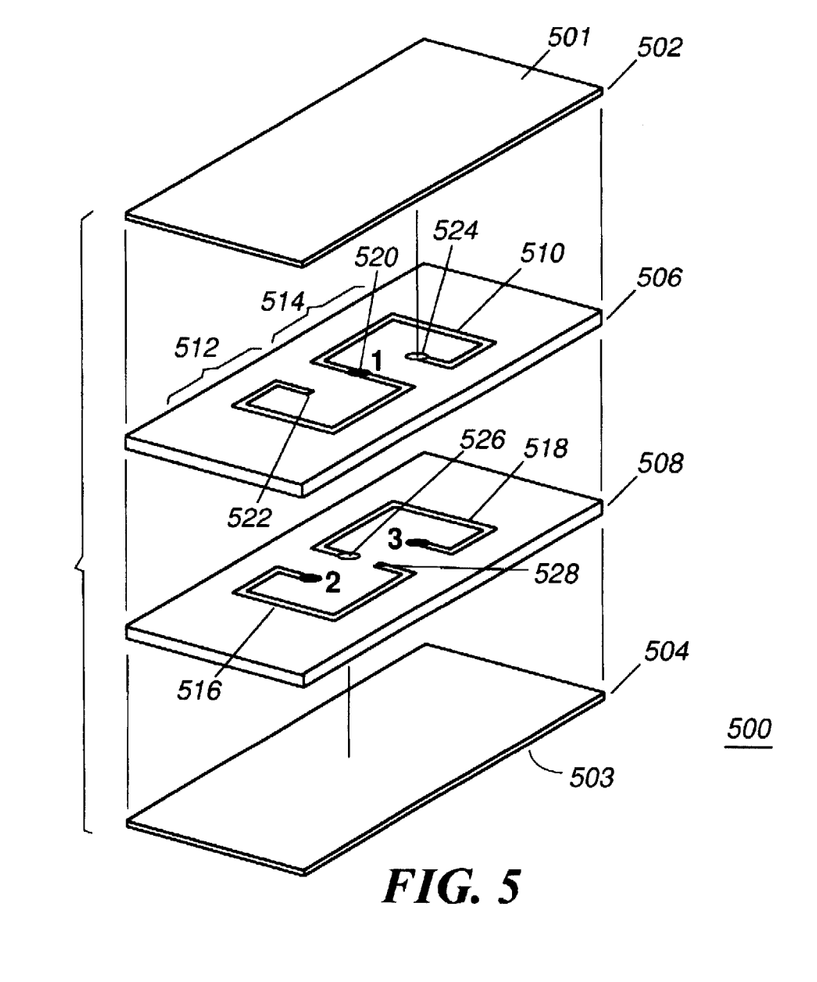
FIG. 5 is yet another embodiment of the balun transformer in accordance with the present invention.

FIG. 5 shows yet another embodiment of the balun transformer of the present invention 500 using a spiral transmission line coupler implementation. In this exploded view, there are shown two outer substrate layers 502, 504 providing ground planes 501, 503 and first and second inner substrate layers 506, 508 sandwiched therebetween. The first substrate layer 506 includes transmission line 510 having first and second coupled spiral portions 512, 514. The second substrate layer 508 includes first and second spiral transmission lines 516, 518 which substantially mirror image those of the first substrate layer in a parallel plane. On the first substrate layer 506, a node, or terminal, 520 joins the first and second spiral portions 512, 514 and functions as an input port 1 for the balun transformer. One end of the first spiral 512 is left open circuited, terminal 522, while the other end of the second spiral is shorted circuited to ground, terminal 524.

On the second substrate layer 508, the two spiral portions 516, 518 are disjoined with one terminal 526 being short circuited to ground which the other terminal 528 is left open circuited. The outer terminals of the first and second spirals of the second substrate layer provide first and second output ports 2, 3.

Schematically, the layouts of all of these balun transformer embodiments still have asymmetrical characteristic of diagonally opposed open circuited terminals and diagonally opposed terminals short circuited to ground, however one skilled in the art appreciates that the physical implementation can take on many layout topologies as demonstrated by the previously described embodiments.

Figure 6:
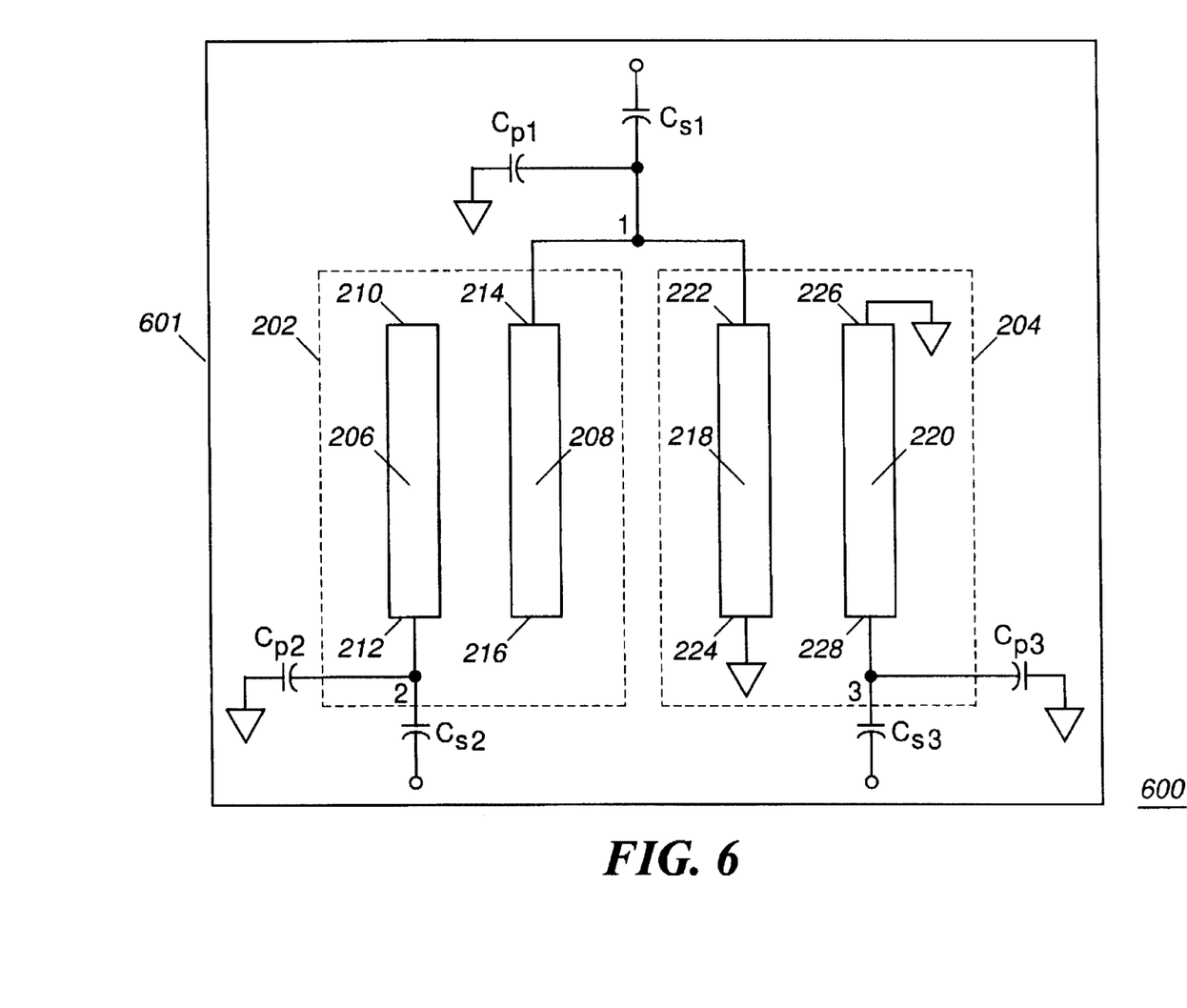
FIG. 6 is a bandpass filter in accordance with the present invention.

Through the addition of tuning elements, such as capacitors or inductors, frequency selectivity may be readily incorporated into the balun transformer of the present invention. Referring now to FIG. 6, there is shown a bandpass filter 600 incorporating the balun transformer 200 described in FIG. 2. Bandpass filter 600 includes the first and second quarter wave couplers 202, 204 as well as several tuning elements, shown here as capacitors $C_{s1}$, $C_{s2}$, $C_{s3}$, $C_{p1}$, $C_{p2}$, and $C_{p3}$, disposed on a substrate 601. The tuning elements are coupled to the input port 1, and the first and second output ports 2, 3. The tuning elements $C_{s1}$, $C_{s2}$, $C_{s3}$, $C_{p1}$, $C_{p2}$, and $C_{p3}$, provide frequency selectivity for the bandpass filter 600.

Figure 7:
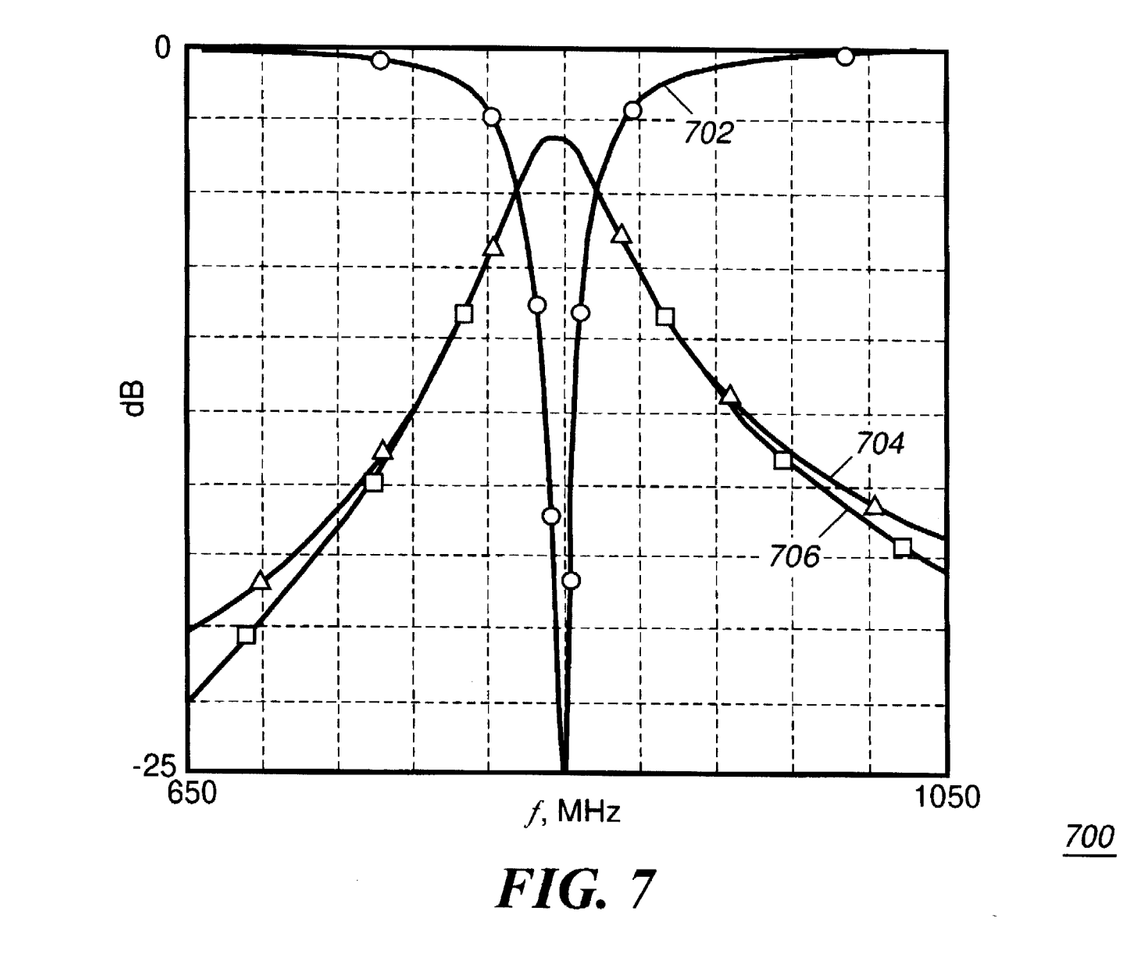
FIG. 7 is a graph of a simulated frequency response for the filter of FIG. 6 in accordance with the present invention.

Referring now to FIG. 7, there is shown a graph of a simulated frequency response for the filter of FIG. 6 in accordance with the present invention. In this simulation a coupling factor, k, of 3 dB, an impedance, $Z_0$, of approximately 70 ohms, and an electrical length of 90 degrees at a frequency of 850 MHz were used. The approximate values selected for the capacitors were $C_{s1}$=1.48 picofarad (pF), $C_{s2}$=2.2 pF, $C_{s3}$=2.2 pF, $C_{p1}$=2.5 pF, $C_{p2}$=5.6 pF, and $C_{p3}$= 5.6 pF. Graph 700 exhibits the excellent differential phase response and characteristics of a two-pole filter for both output ports. The return loss, $S_{11}$ of the input port is shown by designator 702. The insertion loss between the first output port and the input port, $S_{21}$ is shown by designator 704, and the insertion loss between the second output port and the input port, $S_{31}$ is shown by designator 706.

Frequency selectivity may similarly be added to all embodiments of the balun transformer of the present invention. Thus, regardless of the layout topology a variety of bandpass filters can be readily implemented through the addition of tuning elements.

The receiver circuit front-end can be greatly simplified using the bandpass filter described by the invention. The bandpass filter 600 described by the invention can be readily implemented on a number of materials, such as printed circuit board (PCB) and ceramics. Adding the bandpass filter functionality to the balun transformer 200 eliminates the need for a separate bandpass filter in a radio receiver.

Figure 8:
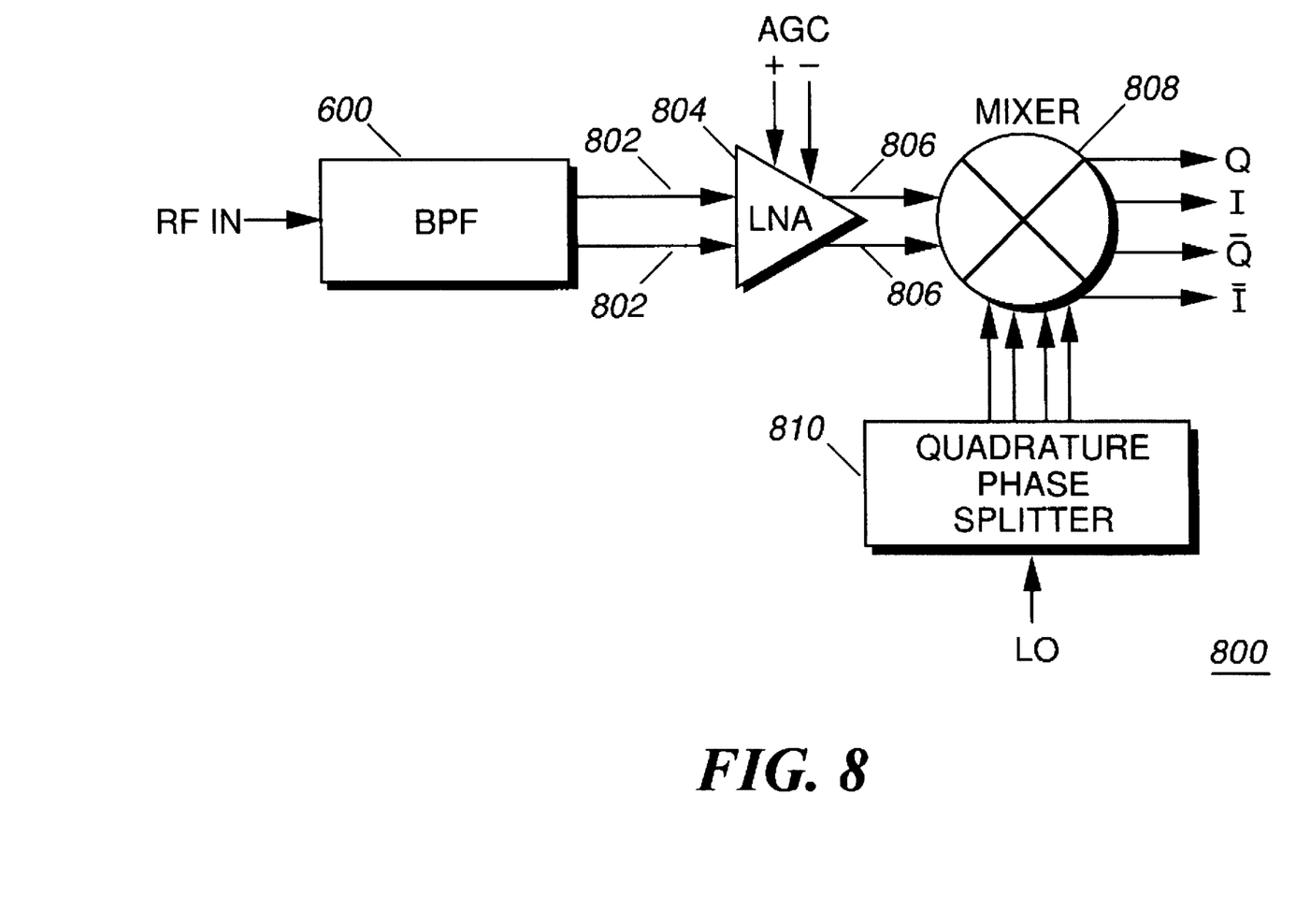
FIG. 8 is a radio receiver in accordance with the present invention.

Referring now to FIG. 8, there is shown a radio adopting a differential circuit topology in accordance with the present invention. The radio receiver 800 includes the bandpass filter (BPF) 600 which combines the functionality of a balun transformer and a two-pole bandpass filter in accordance with the present invention. Bandpass filter 600 takes the unbalanced (single-ended) signal and transforms it to a filtered balanced (differential) signal 802. This filtered differential signal 802 is fed to a low noise amplifier (LNA) 804 which is controlled through an automatic gain control (AGC). An amplified differential signal 806 is then mixed at mixer 808 with a local oscillator (LO) signal which has been split by a quadrature phase splitter 810. Mixer 808 then generates a quadrature output signal QIQI. Hence, the bandpass filter described by the invention simplifies the receiver design by combining the functionality of the balun transformer and the filter into one circuit. Eliminating the filter of the prior art while still maintaining the differential aspect of the circuitry provides the advantage noise immunity with fewer parts. Parts count and overall size of receiver circuits can now be reduced which provides the benefit of reduced cost.

A bandpass filter with differential outputs which implements the balun transformer described by the invention can be extended from microwave frequencies to 800–900 MHz, ultra-high frequencies (UHF), and very-high frequencies (VHF), essentially covering the spectrum of the entire portable and mobile radio products. In addition to filters, the transmission line balun transformer described by the invention can find application in various other radio circuits where differential topologies are desired, such as mixers, or simply as an improved transformer. The transmission line balun transformer described by the invention can take on a variety of layout topologies making it easy to implement in single layer and multi-layer substrates.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A bandpass filter, comprising:
   a balun transformer comprising;
   a first quarter wave coupler formed of two adjacent transmission lines having end terminals wherein the end terminals comprise two diagonally opposed terminals shorted to ground potential, an input terminal, and an output terminal;
   a second quarter wave coupler formed of two adjacent transmission lines having end terminals wherein the end terminals comprise two diagonally opposed open circuited terminals, an input terminal, and an output terminal, the input terminal of the first quarter wave coupler being coupled to the input terminal of the second quarter wave coupler to form a first input port for receiving an RF signal;
   the first and second quarter wave couplers being disposed on a single substrate plane and the output terminal of the first quarter wave coupler and the output terminal of the second quarter wave coupler providing first and second output ports for generating a differential output signal in response to the RF signal; and
   a plurality of tuning elements coupled to the input port and the first and second output ports, said plurality of tuning elements controlling frequency selectivity of the bandpass filter.

2. A bandpass filter, comprising:
   a balun transformer, comprising:
   first and second substrate layers located on parallel planes;
   a first transmission line coupler formed of first and second co-located transmission lines disposed on the first and second substrate layers respectively, the first transmission line having first and second terminals and the second transmission line having third and fourth terminals, the first and fourth terminals being at opposite ends of the first and second co-located transmission lines on parallel planes and being open circuited, the third terminal being an input terminal, and the second terminal being an output terminal;
   a second transmission line coupler formed of third and fourth co-located transmission lines disposed on the first and second substrate layers respectively, the third transmission line having first and second terminals and the fourth transmission line having third and fourth terminals, the first terminal of the third transmission line being an input terminal, the second and third terminals being at opposite ends of the third and fourth co-located transmission lines on parallel planes and being shorted to ground potential, and the fourth terminal being an output terminal;
   the input terminal of the first transmission line coupler and the input terminal of the second transmission line coupler being coupled together to form an input port for receiving a radio frequency (RF) signal, the output terminal of the first transmission line coupler and the output terminal of the second transmission line coupler providing first and second output ports for generating a differential output signal in response to the RF signal; and a plurality of tuning elements coupled to the input port and the first and second output ports, said plurality of tuning elements controlling frequency selectivity of the bandpass filter.

3. A balun transformer as described in claims 2, wherein the first and second transmission line couplers comprises first and second spiral transmission line couplers.

4. A bandpass filter, comprising:
   a balun transformer comprising:
   a first transmission line coupler formed of first and second adjacent transmission lines, the first transmission line having first and second opposed terminals and the second transmission line having third and fourth opposed terminals, the first and fourth terminals being diagonally opposed and open circuited, the third terminal being an input terminal, and the second terminal being an output terminal;
   a second transmission line coupler formed of third and fourth adjacent transmission lines, the third transmission line having first and second opposed terminals and the fourth transmission line having third and fourth opposed terminals, the first terminal of the third transmission line being an input terminal, the second and third terminals of the third and fourth transmission lines being diagonally opposed and shorted to ground potential, and the fourth terminal being an output terminal;
   the input terminal of the first transmission line coupler and the input terminal of the second transmission line coupler being coupled together to form an input port for receiving a radio frequency (RF) signal, the output terminal of the first transmission line coupler and the output terminal of the second transmission line coupler providing first and second output ports for generating a differential output signal in response to the RF signal; and
   first, second, and third tuning circuits coupled to the input port and the first and second output ports respectively for controlling frequency selectivity of the bandpass filter.

5. A bandpass filter, comprising:
   a transmission line balun transformer, comprising:
   a first quarter wave coupler formed of two adjacent transmission lines having end terminals wherein the end terminals comprise two diagonally opposed terminals shorted to ground, an input terminal, and an output terminal;
   a second quarter wave coupler formed of two adjacent transmission lines having end terminals wherein the end terminals comprise two diagonally opposed open circuited terminals, an input terminal, and an output terminal, the input terminal of the first quarter wave coupler being coupled to the input terminal of the second quarter wave coupler to form a first input port for receiving an RF signal;
   the output terminal of the first quarter wave coupler and the output terminal of the second quarter wave coupler providing first and second output ports for generating a differential output signal in response to the RF signal; and
   tuning elements coupled to the input port and the first and second output ports for controlling frequency selectivity of the bandpass filter.

6. A communication device, including:
   a bandpass filter for receiving a (radio frequency) RF signal said bandpass filter, comprising:

a balun transformer, comprising:

a first quarter wave coupler formed of two adjacent transmission lines having end terminals wherein the end terminals comprise two diagonally opposed terminals shorted to ground potential, an input terminal, and an output terminal;

a second quarter wave coupler formed of two adjacent transmission lines having end terminals wherein the end terminals comprise two diagonally opposed open circuited terminals, an input terminal, and an output terminal, the input terminal of the first quarter wave coupler being coupled to the input terminal of the second quarter wave coupler to form a first input port for receiving an RF signal; and the output terminal of the first quarter wave coupler and the output terminal of the second quarter wave coupler providing first and second output ports for generating a differential output signal in response to the RF signal;

tuning elements coupled to the input port and the first and second output ports for controlling frequency selectivity of the bandpass filter;

a low noise amplifier for receiving the differential signal and providing an amplified differential signal; and a mixer for mixing the amplified differential signal with a quadrature phase split signal to generate a quadrature output signal.

7. A communication device as described in claim 6, wherein the communication device comprises a portable radio.

8. A communication device as described in claim 6, wherein the communication device comprises a mobile radio.

* * * * *